United States Patent
Oropallo et al.

(10) Patent No.: US 9,371,635 B2
(45) Date of Patent: Jun. 21, 2016

(54) STRAINER AND INSERT ASSEMBLY

(71) Applicant: IPS Corporation, Collierville, TN (US)

(72) Inventors: Robert A. Oropallo, Pasadena, CA (US); Anthony Oropallo, Commerce, CA (US)

(73) Assignee: IPS Corporation, Collierville, TN (US)

( * ) Notice: Subject to any disclaimer, the term of this patent is extended or adjusted under 35 U.S.C. 154(b) by 0 days.

(21) Appl. No.: 14/678,325

(22) Filed: Apr. 3, 2015

(65) Prior Publication Data

US 2015/0211219 A1 Jul. 30, 2015

Related U.S. Application Data

(63) Continuation of application No. 13/068,741, filed on May 19, 2011, now Pat. No. 9,091,046.

(60) Provisional application No. 61/396,576, filed on May 28, 2010.

(51) Int. Cl.
*E03C 1/26* (2006.01)
*E03C 1/244* (2006.01)
*B23P 17/04* (2006.01)

(52) U.S. Cl.
CPC . *E03C 1/26* (2013.01); *B23P 17/04* (2013.01); *E03C 1/244* (2013.01); *Y10T 29/4987* (2015.01); *Y10T 29/49826* (2015.01)

(58) Field of Classification Search
CPC ............. E03C 1/262; E03C 1/24; E03C 1/26; A47K 1/14
USPC ....................... 4/286, 287, 289–292
See application file for complete search history.

(56) References Cited

U.S. PATENT DOCUMENTS

| | | | |
|---|---|---|---|
| 2,643,394 A | 6/1953 | Wood | |
| 5,745,931 A | 5/1998 | Ball | |
| 5,881,397 A * | 3/1999 | Hobbs | A47K 1/14 251/297 |
| 6,880,179 B2 | 4/2005 | Wang | |
| 7,503,083 B2 | 3/2009 | Ball | |
| 2011/0209279 A1* | 9/2011 | Ball | E03C 1/22 4/292 |

* cited by examiner

*Primary Examiner* — Huyen Le
(74) *Attorney, Agent, or Firm* — Alston & Bird LLP

(57) ABSTRACT

In combination a tubular strainer having a wall defining interior and exterior surfaces, and a first flange on the upper end of the wall, a tubular insert having a cylindrical wall sized for reception by the tubular strainer, and a second flange carried by the insert wall, an elastomeric seal having a tubular body fittingly sealingly carried by the insert cylindrical wall, the seal body configured for progressive compressive radial sealing engagement with the strainer wall interior surface when endwise inserted by the insert within said tubular strainer.

13 Claims, 2 Drawing Sheets

Figure 3:
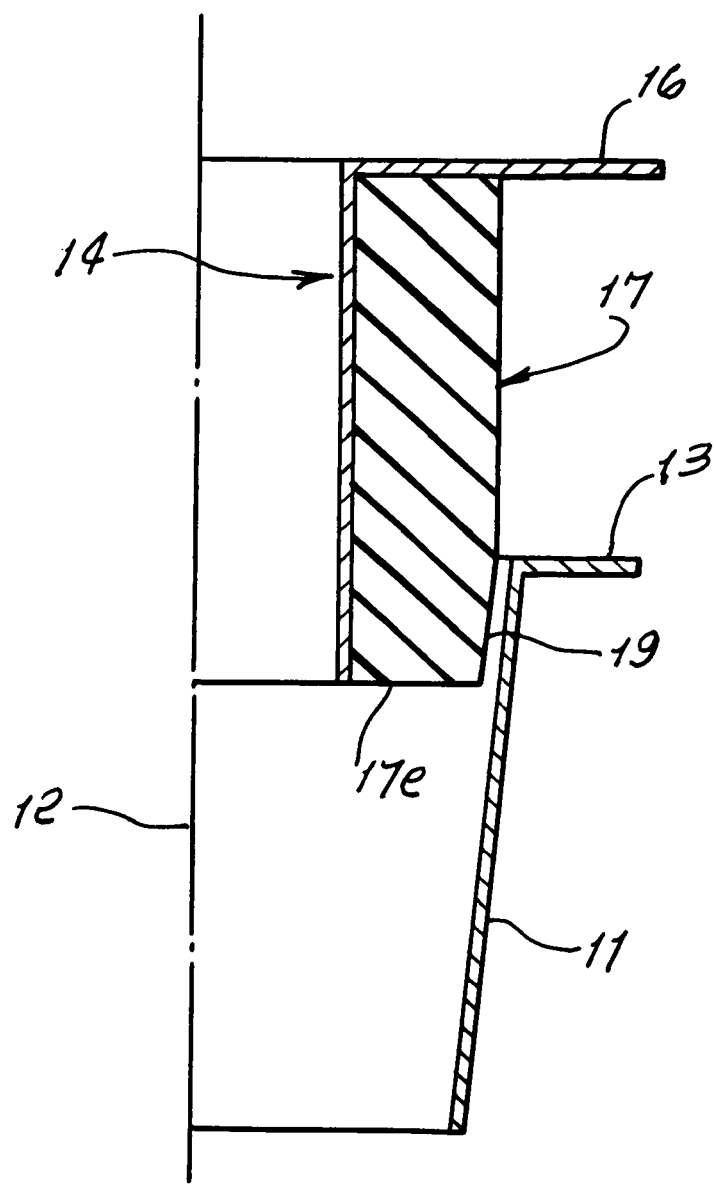

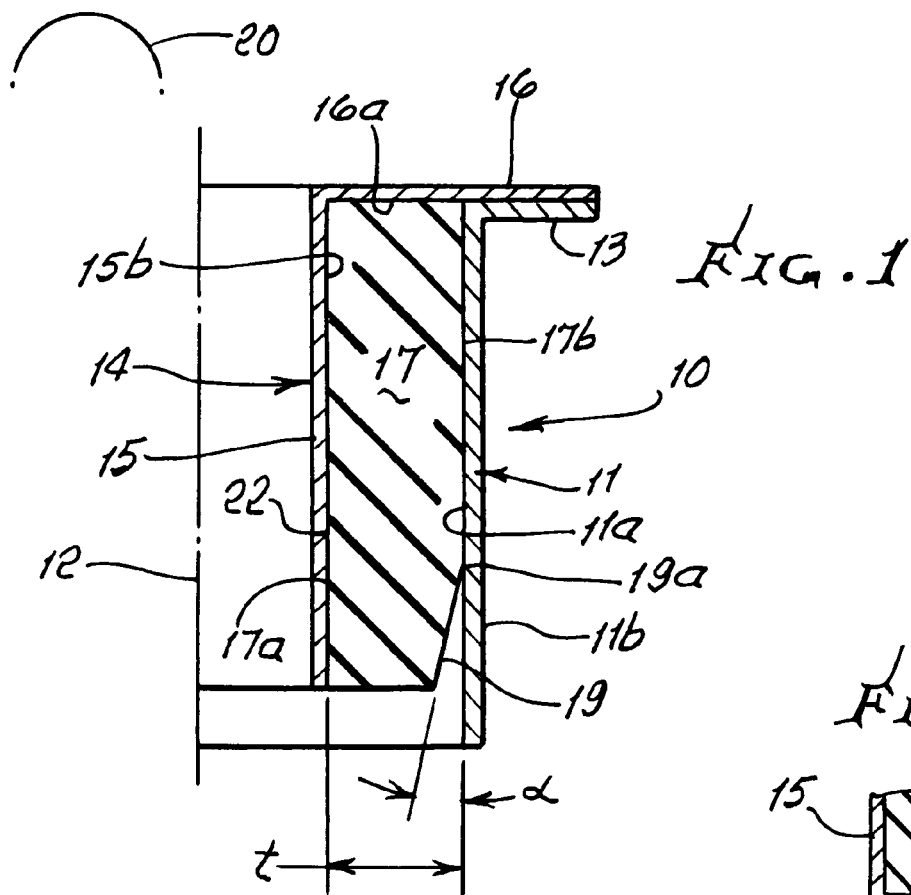
FIG.1
FIG.1a
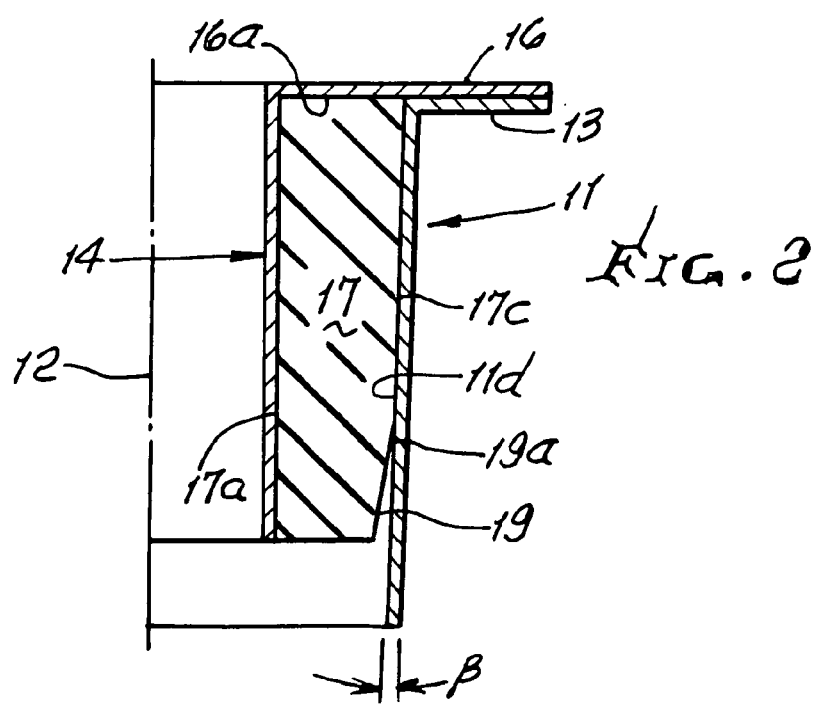
FIG.2

STRAINER AND INSERT ASSEMBLY

CROSS-REFERENCE TO RELATED APPLICATIONS

This application is a continuation of U.S. patent application Ser. No. 13/068,741, filed on May 19, 2011, which claims priority to U.S. Provisional Patent Application No. 61/396,576, filed on May 28, 2010, each of which is incorporated herein in its entirety by reference.

BACKGROUND OF THE INVENTION

This invention concerns an assembly of an insert carrying an annular elastomer seal into a sink strainer, for drain use; and more particularly concerns facilitation of slide together entry assembly of the insert into the strainer, and slide apart disassembly of these elements, where the seal is elongated and has extended pressure contact with the strainer.

There is need for improved configuration of the insert, seal and strainer elements, to facilitate ease of their axial assembly, and disassembly, despite pressure surface contact of the seal and strainer, and considering that the seal is to be kept in retained position on an insert tube.

There is also need for simple, effective, and improved relative configurations of these elements facilitating their desired operations, including relative axial slide together and slide apart functioning, and where the elastomer seal body is relatively thick and elongated, between and in relation to the insert and strainer elements.

SUMMARY OF THE INVENTION

It is a major object of the invention to provide an improved drain construction meeting the above needs. Basically, the invention comprises, in combination
a) a tubular strainer having a wall defining interior and exterior surfaces, and a first flange on the upper end of that wall,
b) a tubular insert having a cylindrical wall sized for reception by the tubular strainer, and a second flange carried by the insert wall,
c) an elastomeric seal having a tubular body fittingly and sealingly carried by the insert cylindrical wall,
d) the elongated seal body configured for progressive compressive radial sealing engagement with the strainer wall interior surface, when endwise inserted by the insert within said tubular strainer.

It is another object to provide a radial lip at the lower distal end of the tubular insert wall for retaining the seal in position on the insert cylindrical wall. In this regard, irregularities may be provided on the outer surface of the insert wall, for engaging and retaining the seal in position on the insert tube, or that outer surface may be smooth.

It is a further object to provide an elastomeric annular seal having axially parallel internal and external seal surfaces on a relatively thick body, the seal having an elongated wall portion in compressive engagement with the strainer internal surface. In this regard the seal external surface may have a reduced end portion, for guide purposing and which is free of compressive engagement with the strainer interior surface.

Yet another object is to provide a strainer tube interior surface that is shallowly tapered along surface length throughout the major axial length of the seal. In this regard, the seal body may define an external piloting bevel at the forwardmost extent of the seal, the bevel located to engage the strainer after the bevel is initially introduced fully into the entrance opening defined by the strainer for receiving the seal and easing and centering its travel.

Another object is to provide a seal cylindrical inner surface that extends throughout the seal endwise extent, and which resiliently grip the insert cylindrical wall to maintain seal axial position thereon.

The insert cylinder may have a radial lip at its lowermost end, to add to seal retention between the insert flange and the distal end of the seal.

These and other objects and advantages of the invention, as well as the details of an illustrative embodiment, will be more fully understood from the following specification and drawings, in which:

DRAWING DESCRIPTION

FIG. 1 shows, in axial section, a preferred form of the insert, seal and strainer wall configuration;
FIG. 1*a* is a fragmentary view;
FIG. 2 is a view like FIG. 1 but showing a modification;
FIG. 3 is a view like FIG. 2, but showing initial pilot entry of the seal and insert into the strainer.

DETAILED DESCRIPTION

In FIG. 1, an annular metallic tubular strainer 10 has a thin cylindrical wall 11 defining a longitudinally downwardly extending axis 12. The strainer wall has interior and exterior surfaces 11*a* and 11*b*, and a first flange 13 extending generally radially outwardly, laterally, from the top of wall 11.

A tubular metallic insert 14 has a thin cylindrical wall 15 sized for downward reception into the bore formed by wall 11, and has a second flange 16 at the top of, and carried by, wall 15. Flange 16 typically seats on flange 13, or on a thin flat elastomeric seal extending between 13 and 16.

An elastomeric, such as rubber, seal 17 carried by wall 11, is in fittingly sealing and retained relation with the outer surface 15*b* of 15, along the seal downwardly elongated length of seal bore 17*a*. As the insert 14 is pushed downwardly into the bore forward by interior cylindrical surface 11*a*, the seal becomes progressively radially compressed sufficient for sealing. The seal also becomes endwise axially compressed, against shoulder 16*a* of flange 16. Such seal insertion to slidably engage inner wall 11*a* of the strainer is aided by an annular piloting bevel 19 formed by the seal lower portion, the bevel tapering at an angle α between about 5° and 25°. The bevel upper end 19*a* is in shallow angular piloting engagement with the strainer wall interior surface and acts to facilitate radial and axial compression of the seal, progressively along its length during insert insertion axially into the strainer; however, the interference fit of the seal outer surface 17*b* with bore 11*a* of the strainer is insufficient to prevent ready insertion of the seal into and along the bore 11*a*, or to prevent pull-out withdrawal of the insert from that bore. A pull-out knob 20 may optionally be provided on the insert, leaving radial drain space between the knob and flange 16.

The seal wall thickness "t" between walls 11 and 15 is sufficient to absorb axial forces transmitted from outer extent of the seal toward the retention interfit of 15 with the seal bore, at 22, that might otherwise strip the seal off wall 15, as during insert pull-out. Accordingly, the seal has sliding and sealing interfit with the wall 11, and fixed sealing interfit with wall 15, aided by the seal construction. The fixed interfit may be enhanced by roughness (such as a knurl) of exterior surface at 15*b* of wall 15, or by provision of a lip 24 at the lower edge of 17. See FIG. 1*a*.

In FIG. 2, the elements and operation are the same as in FIG. 1; however the wall 11 is tapered downwardly at angle β, between 3° and 15°, whereby the seal outer wall 17c above bevel 19, is progressively and increasingly radially compressed by wall 11 as the seal is pushed downwardly by the insert, to increase effective sealing between 17c and wall tapered inner surface 11d; however, the bevel 19, to the extent that it progressively engages surface 11d, serves to ease insertion of the insert into the strainer tapered wall 11. Tapered surface 11d may be coated with a low friction substance, such as molybdenum disulfide to assist such insert push-in, and push-out.

FIG. 3 is a view of the elements of FIG. 2, at the time of initial assembly of the insert into the strainer, showing uninterrupted introduction of the beveled lower end 17e of the seal 17 into the open upper end of the tapered strainer wall.

The invention claimed is:

1. An assembly comprising;
   a tubular strainer having a wall defining interior and exterior surfaces, and a first flange on an upper end of said wall;
   a tubular insert having a cylindrical wall sized for reception by said tubular strainer, and a second flange carried by the cylindrical wall; and
   an elastomeric seal having a tubular body fittingly sealingly carried by the cylindrical wall of the insert,
   wherein the seal body is configured for progressive compressive radial sealing engagement with the strainer wall interior surface when the insert and seal are inserted within the tubular strainer, and wherein the seal defines an external bevel at the forwardmost extent of the seal.

2. The assembly of claim 1 further comprising a radial lip at the lower distal end of the cylindrical wall of the insert and configured to assist retaining the seal in position on the cylindrical wall.

3. The assembly of claim 1 further comprising irregularities on the outer surface of the cylindrical wall of the insert and configured to engage and retain the seal in position on the insert.

4. The assembly of claim 3, wherein the irregularities define a knurl.

5. The assembly of claim 1, wherein the seal is tubular to define parallel internal and external seal surfaces, the seal external surface having an elongated wall portion in compressive engagement with the strainer internal surface.

6. The assembly of claim 5, wherein the seal external surface has a rearward end portion proximate the insert flange.

7. The assembly of claim 1, wherein the cylindrical wall of the insert has a distal end which extends in the same direction as the remainder of the cylindrical wall.

8. The assembly of claim 1, wherein the seal has a cylindrical inner surface that extends throughout the seal endwise extent, and which resiliently grips the cylindrical wall of the insert.

9. The assembly of claim 1, wherein the seal body extends to the second flange, and is spaced radially inwardly of the first flange.

10. The assembly of claim 9, wherein the seal defines an external bevel at the forwardmost extent of the seal.

11. An assembly comprising:
    a tubular strainer having a wall defining interior and exterior surfaces, and a first flange on an upper end of said wall;
    a tubular insert having a cylindrical wall sized for reception by said tubular strainer, and a second flange carried by the cylindrical wall; and
    an elastomeric seal having a tubular body fittingly sealingly carried by the cylindrical wall of the insert,
    wherein the seal body is configured for progressive compressive radial sealing engagement with the strainer wall interior surface when the insert and seal are inserted within the tubular strainer, and
    wherein the strainer interior surface is tapered along its length, and wherein the seal defines an external bevel at the forwardmost extent of the seal.

12. The assembly of claim 11, wherein the seal is tubular to define parallel internal and external seal surfaces, the seal external surface having an elongated wall portion in compressive engagement with the strainer internal surface.

13. A method of assembling an insert and strainer assembly comprising:
    providing a tubular strainer having a wall defining interior and exterior surfaces, and a first flange on an upper end of the wall;
    providing a tubular insert having a cylindrical wall sized for reception by the tubular strainer, and a second flange carried by the cylindrical wall;
    providing an elastomeric seal having a tubular body, the seal defining internal and external seal surfaces, wherein the seal defines an external bevel at the forwardmost extent of the seal;
    retaining the seal on the cylindrical wall of the tubular insert; and
    inserting the insert and seal into the strainer such that the outer surface of the seal progressively engages with the interior surface of the strainer as the insert and seal are forced downwardly into the strainer.

* * * * *